EMERY DUDINEC
INVENTOR.

BY Lawrence J. Winter
atty.

United States Patent Office 2,934,165
Patented Apr. 26, 1960

2,934,165

FILTER

Emery Dudinec, Rahway, N.J., assignor to Purolator Products, Inc., Rahway, N.J., a corporation of Delaware Application June 17, 1958, Serial No. 742,653

5 Claims. (Cl. 183—44)

The present invention relates to a filter and more particularly, to a dry type gas filter.

An object of the present invention is to provide a dry type gas filter assembly which is of simple construction and lends itself to facility in the maufacture thereof and is further inexpensively produced.

Another object of the present invention is to provide a filter assembly wherein the housing comprises a casing within a casing over which is telescoped a cover member, all of which may be readily stamped or pressed into their configurations by simple manufacturing operations, and eliminates the need for elbows or other protruding structure normally associated therewith.

Still, yet, another object of the present invention is to provide a filter assembly which has a novel flame arrestor formed integral with the casing.

The present invention further provides a filter assembly in which the inlet and outlet means thereto may be readily disposed in any desired position laterally of each other.

The present invention further provides a filter assembly in which the cover member does not require sealing means where it telescopes over the filter housing or casing.

The present invention also provides a filter assembly which may be utilized when the assembly is used on a compressor since means are provided for preventing any direct or high back pressure from impinging directly against the paper compounded filter element used therein.

Figure 1:
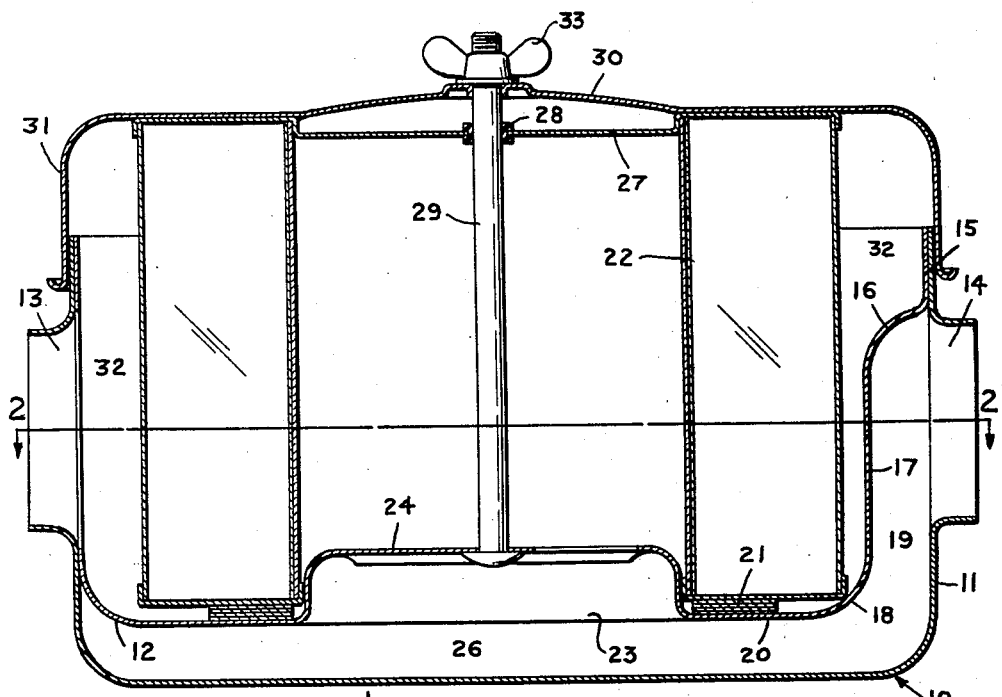
Figure 2:
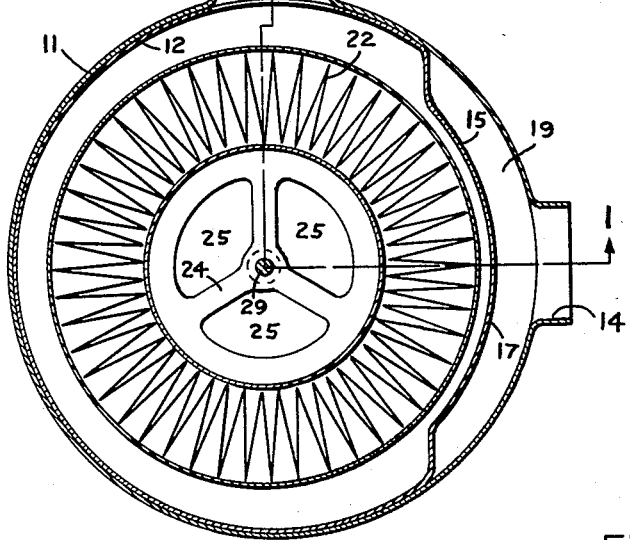

The invention will be better understood from the following description when considered in connection with the accompanying drawing forming a part thereof and in which:

Fig. 1 is an enlarged quarter section view of the filter assembly of the present invention taken on lines 1—1 of Fig. 2, and Fig. 2 is a horizontal section taken on lines 2—2 of Fig. 1.

Referring to the drawings, the reference numeral 10 designates a filter assembly having an outer cylindrical casing 11 and an inner cylindrical casing 12 disposed therein. Casing 11 is perfectly cylindrical as best seen in Fig. 2 and is provided with inlet and outlet openings 13 and 14 respectively, approximately half way up the casing wall and spaced 90° apart from each other. The upper end of casing 11 is open.

Inner casing or shell 12 is also open at the upper end thereof and is press fitted within the outer casing. Casing 12 is cylindrical in shape, except for the lower portion thereof adjacent outlet 14, which has the sidewall 15 thereof indented or flared inwardly adjacent the upper portion of outlet 14, as at 16. Thereafter, this sidewall extends vertically downwardly as at 17 below the lower edge of outlet 14 at which point the sidewall is flared downwardly and inwardly as at 18 to provide an arcuate vertical outlet passage or chamber 19 within casing 11 opposite outlet 14. Casing 12 has an annular flat bottom 20 which forms a seat on which is disposed a filter element 22. An annular gasket 21 is preferably disposed between the end of the filter and casing to provide a seal therebetween. The lower central portion 23 of shell 11 is recessed and extends upwardly in a vertical direction and then in a horizontal direction terminating in a spider arrangement 24 having openings or ports 25 therein. The upper end of casing 12 is coextensive with casing 11 while the bottom 20 thereof is in spaced relationship with the bottom of casing 11 to form a circular horizontal chamber or passage 26 therebetween in communication with openings 25.

The annular filter element 22 is preferably formed of conventional resin impregnated pleated paper and is provided with a disc or grommet 27 which seals off the annular opening in the upper end of the element. Grommet 27 is provided with an annular rubber or resilient gasket disposed in the central opening thereof.

A bolt 29 having a head on the lower end thereof extends through the center of spider 24, grommet 27, and the central opening of a cylindrical cover member 30. Cover member 30 has a sidewall or depending skirt 31 around the rim thereof which extends below the upper edges of casings 11 and 12 to close off the annular chamber 32 formed between the filter element and casing 12. A wing nut 33 is threaded on bolt 29 to press the inner surface of the cover member against the upper end of the filter element 22 and seal off the lower end of the filter element.

In operation, when clean air, for example, is desired for the carburetor of an internal combustion engine, the outlet 14 of the filter assembly may be clamped to a carburetor, now shown, and incoming air passes through inlet 13 and around the outside of filter element 22 in chamber 32 formed by shell 11 and cover member 27 and thereafter flows through the filter element 22 so that any contaminants in the air are deposited on the outer surface of the pleated filter elements. No seal is required between skirt 31 of cover member 30 and the upper end of shell 11 which the skirt telescopes as any air which enters the filter assembly in this manner must still pass through the filter element before being discharged from the filter assembly. Gasket 21 prevents any incoming air from by-passing the lower end of the filter element while grommet 27 and sealing disc 28 prevent the incoming air from by-passing the filter element around the upper portion thereof. The filtered air after passing through filter element 22 exits through openings 25 in spider 24 and passes into circular chamber 25 after which it changes its direction of flow, is discharged through outlet passage 19, again changes its direction of flow and passes through outlet 14 and to a point of use, not shown.

The provision of the indentation formed by portions 16, 17 and 18 of wall member 15 masking the outlet opening 14 provides a flame arrestor which readily protects the filter element 22 should there be any flare back from the engine with which the filter element is used. In addition, this baffle arrangement also prevents any high back pressure or air impulse from rupturing the paper filter element when the filter assembly is used with an air compressor wherein these high back pressure impulses are frequently encountered due to the compressor periodically shutting off. Any high pressure surge of air would strike the portion 17 of wall member 15, have its direction changed so that the impulse is directed downwardly into chamber 26, and again have its direction changed upwardly before the force would encounter the paper filter element 22. Thus, the force would be greatly attenuated by the time it ever reached the filter element.

With the filter assembly of the present invention, filter element 22, when it becomes clogged or dirty, may be easily cleaned or replaced by merely removing the nut 33 from the center post 29 and taking off cover 30 after which the filter element is cleaned or replaced and the cover and nut replaced so that the element is ready again for service.

As can be readily observed, with the structure of the present invention inlet and outlet openings 13 and 14, although shown spaced 90° apart from each other, may be easily moved laterally of one another should the installation require a displacement of 180° between the inlet and outlet, or some other variation less than the 90° spacing shown. This requires no additional machining in the manufacture of the assembly and may be made without encountering additional expenses or costs.

The provision of the casing 12 within casing 11 by forming the indenture in wall 15 thereof so as to provide an outlet passage 19 enclosed within the outer shell 11 eliminates the need for special elbows or other projections which extend beyond the outer casing 11 so that a more compact filter assembly is provided to fit under the limited capacity of hoods used in present day engines.

Inasmuch as various changes may be made in the form, location and relative arrangement of the several parts without departing from the essential characteristics of the invention, it will be understood that the invention is not to be limited except by the scope of the appended claims.

What is claimed is:

1. A filter unit comprising a housing formed of an open end outer cylindrical casing and an open end inner cylindrical casing press fitted therein, the bottom of said inner casing being spaced from the bottom of said outer casing to provide a bottom chamber therebetween, the sidewall of said inner casing being indented to form an arcuate chamber between said casings communicating with said bottom chamber, air inlet means disposed in the sidewall of said casings communicating with the interior of the inner casing, air outlet means in the bottom of the inner casing in communication with said bottom chamber, a filter element positioned in said inner casing between said inlet and outlet means, other air outlet means in the sidewall of the outer casing in alignment with said arcuate chamber, and a removable cover member seated over said filter element enclosing the open ends of said casings.

2. A filter unit comprising a housing formed of an open end outer casing and an open end inner casing having its sidewalls in contact with the outer casing and its bottom spaced from the bottom of the outer casing to provide a bottom chamber therebetween, a portion of the sidewall of the inner casing indented to form another chamber between the casings communicating with said bottom chamber, air inlet means in the sidewall of the casings communicating with the interior of the inner casing, air outlet means in the bottom of the inner casing in communication with said bottom chamber, a filter element in the inner casing between said inlet and outlet means, other air outlet means in the sidewall of the outer casing adjacent the side chamber between said casing sidewalls, and a removable cover member enclosing the open ends of the casings.

3. A filter unit comprising a housing consisting of an open end outer cylindrical casing and an open end inner cylindrical casing disposed therein with the sidewalls in contact with each other and the ends coextensive, the bottom of the inner casing being spaced from the outer casing to provide a circular chamber therebetween, a portion of the sidewall of the inner casing being indented to form a space between said casings in communication with said bottom chamber, air inlet means extending through the sidewall of the casings in communication with the interior of the inner casing, air outlet means in the bottom of the inner casing communicating with said circular chamber, a filter element in the inner casing between the inlet and outlet means, other outlet means in the outer casing sidewall spaced laterally of said air inlet means and adjacent said indented wall, and a removable cover enclosing the open ends of said casings.

4. The filter unit of claim 3 wherein the indented portion of said inner casing provides an arcuate space formed by the sidewall flaring inwardly adjacent the upper portion of said other outlet means then vertically downwardly to a point below it and inwardly to join the bottom of said casing.

5. A filter unit comprising a metal housing formed by an inner casing press fitted into an outer casing with the sidewalls in contact with each other and the bottoms spaced from each other to provide an air chamber therebetween, the upper ends of said casing being open, a portion of the sidewall of said inner casing being deformed inwardly to define an air space between the casings in communication with said air chamber, said inner casing having a discharge opening in the bottom thereof communicating with said air chamber, said outer casing having an air discharge outlet therein in alignment with the deformed inner casing sidewall, said casing sidewalls having an air inlet opening therein at a point where they contact each other, said inlet opening being disposed therein laterally of said discharge outlet, an annular filter element in said inner casing between said inlet opening and said discharge opening, and a removable cover enclosing the open ends of said casings.

References Cited in the file of this patent

UNITED STATES PATENTS

| | | |
|---|---|---|
| 2,383,364 | Bechman | Aug. 21, 1945 |
| 2,510,440 | Vokes | June 6, 1950 |
| 2,732,031 | Rabbitt et al. | Jan. 24, 1956 |

FOREIGN PATENTS

| | | |
|---|---|---|
| 1,052,479 | France | Sept. 23, 1953 |